April 10, 1951 — L. C. HESTER — 2,548,261
DITCHING PLOW
Filed July 28, 1948 — 2 Sheets-Sheet 1

Inventor
Levi C. Hester
Attys.

April 10, 1951 L. C. HESTER 2,548,261
DITCHING PLOW
Filed July 28, 1948 2 Sheets-Sheet 2
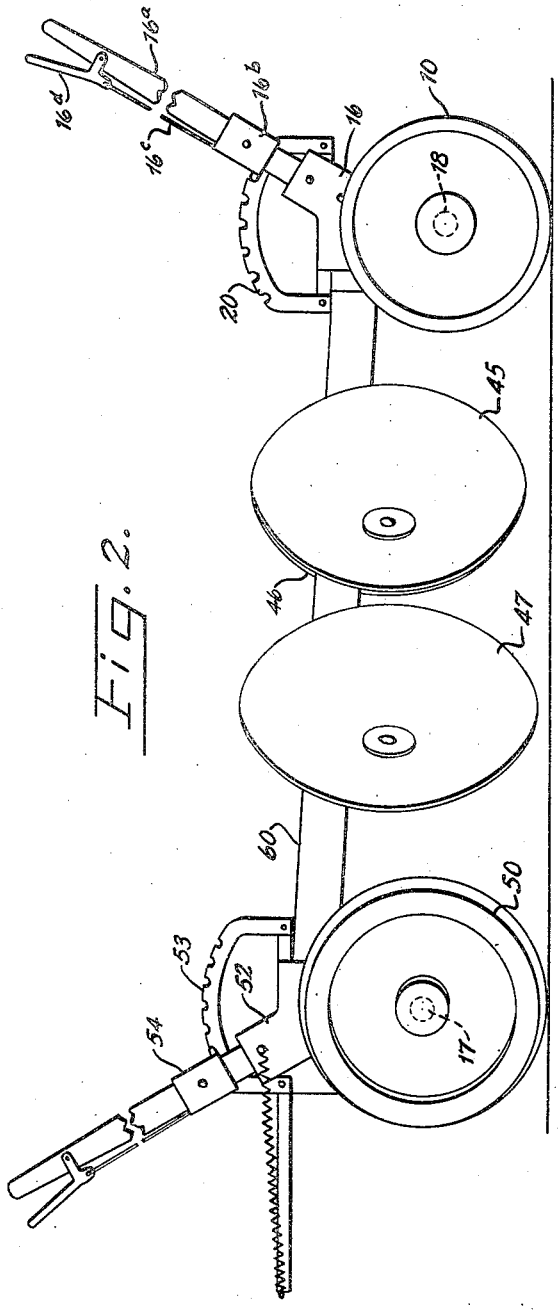
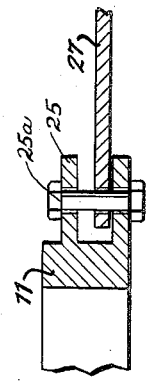
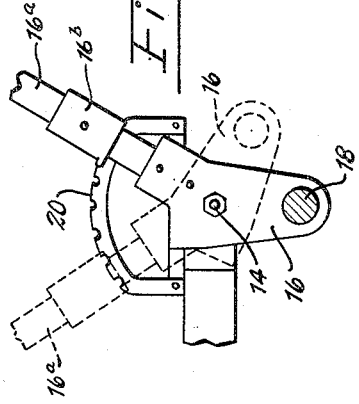
Inventor
Levi C. Hester Patented Apr. 10, 1951

2,548,261

UNITED STATES PATENT OFFICE 2,548,261

DITCHING PLOW

Levi C. Hester, Jacksonville, Fla.

Application July 28, 1948, Serial No. 41,131

2 Claims. (Cl. 97—53)

My present invention relates to disc plows and it has for its object to provide an instrumentality of this character which is especially adapted for heavy duty plowing in breaking soil in new and old farm lands and particularly for cutting trenches, fire lanes and drainage ditches.

Another object of my invention resides in the arrangement of two forward discs for throwing earth laterally in opposite directions and a central disc for clearing out the bottom of the ditch or channel.

A still further object of my invention is to provide a disc plow especially adapted for cutting trenches and ditches in which three offset discs are employed for digging a trench and throwing the earth at opposite sides thereof, which is readily convertible by the removal of one of said discs for digging drainage ditches where it is desirable to deposit the earth entirely at one side of the ditch.

My invention also comprehends a novel frame construction on which the discs are mounted by means of which they are maintained in their proper angular working position.

To these and other ends my invention comprises further improvements and advantages as will be further described in the accompanying specification, the novel features thereof being set forth in the appended claims.

In the drawings:

Figure 2 is a side elevation showing the frame elevated to hold the discs in an inoperative position.

Figure 3 is a detail view of one of the frame elevating and lowering devices taken on the line 3—3 of Fig. 1 and Figure 4 is a cross sectional view taken on the line 4—4 of Fig. 1.

Similar reference numerals, in the several figures, indicate similar parts.

Figure 1:
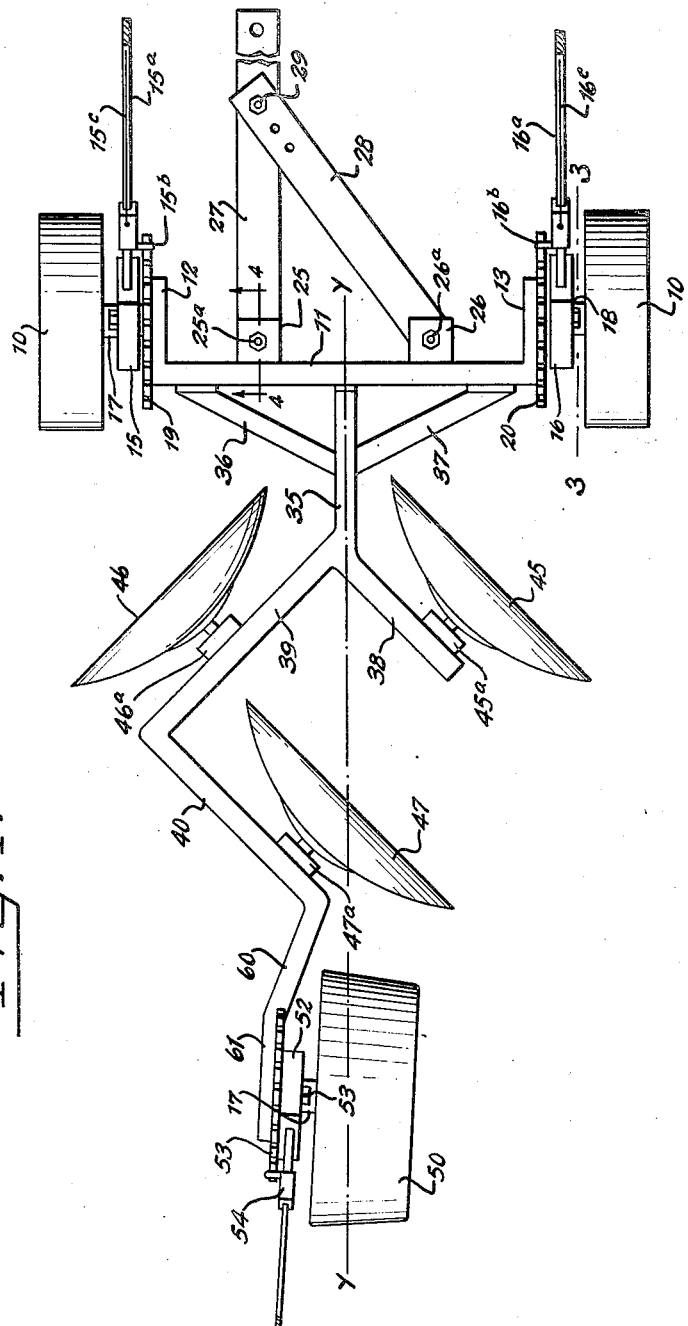
Figure 1 is a top plan view showing a ditching plow embodying my present invention.

A plow embodying my invention is intended to be tractor drawn, to cut a comparatively uniformly wide and deep channel or furrow upon a single pass across a field and over any terrain which a tractor is capable of travelling. It comprises a forward truck or carriage supported on broad faced surface engaging ground wheels 10—10 and a cross frame connecting them. The latter is a bar 11 having at its ends forward extensions 12—13. Pivoted on their outer faces, as indicated at 14 in Fig. 3, are the elevating lever arms 15—16, the lower ends of which carry the axles 17—18 on which the wheels 10 are journaled. In order to operate these arms they are provided with upwardly extending arms 15ª—16ª provided with latches 15ᵇ—16ᵇ cooperating with notched quadrants 19—20.

The latches are capable of being lifted into inoperative position by retracting rods 15ᶜ—16ᶜ which are controlled by pivoted hand grips such as 16ᵈ, Fig. 2.

On the forward side of the bar 11 there are pairs of ears 25—26 between which there are secured by bolts 25ª—26ª, a draw bar 27 and a brace bar 28, respectively, the latter at its forward end being connected to the draw bar by a bolt 29 by means of which it is attached to a tractor. The draw bar is located slightly to one side of the center line of the cross frame bar 11 to counter balance the action of the discs so that the frame will follow the tractor in a straight line making for easy turning. This coupling being rigid and allowing only an up and down movement of the frame also enables the tractor and plow to be backed without damage to either of them.

The disc carrying frame is of special construction and shape being made as a solid forging to adapt the plow to two different classes of work. At its forward end there is a short tongue or draft portion 35 rigidly connected to the rear side of cross bar 11 and extending in the line of movement of the vehicle. This tongue is braced laterally by the bracket pieces 36—37 the outer ends of which are also united to the cross bar 11 near its extremities.

The rear end of tongue 35 is forked forming at one side a short arm 38 and at the other a longer arm 39. These arms are at right angles to each other each extending rearwardly. At the rear end of one of these arms, such as arm 39, is another right angle arm 40, in parallelism with arm 38, the extremity of which terminates short of the median line of the carriage and the tongue portion 35, as indicated by Y—Y in Fig. 1.

On the forward faces of arms 38 and 39 are discs 45—46 carried by removable journal boxes 45ª—46ª. These discs are 26 inches in diameter. A similar disc 47 which is of 28 inch diameter is supported in a journal box 47ª on the forward side of arm 40 in position to cut into the tracks or furrows formed by each of the discs 45—46. Otherwise expressed, as will be observed from Fig. 1, the two forward discs 45 and 46 while facing in opposite directions are located equidistantly at opposite sides of the median line Y—Y and the rear or third disc has the center of its cutting edge located on said line.

The rear end of the above described frame is carried by a supporting wheel 50 the axle 51 of which is on the lower end of an adjusting lever 52 rotatable about a bolt 53 on the rear end of the frame. Lever 52 is in all respects the same as the mountings for wheels 10, there being also a quadrant 53 and a cooperating latch 54.

In providing for the mounting of wheel 50 I project from the inner end of the arm portion 40 of the frame a rearwardly extending tail piece 60 which veers away from the center line Y—Y for a short distance and terminates in an arm 61, the relationship of which to said center line is such as to throw the axis of wheel 50 into such a position that the forward edge of said wheel in rotating in contact with the ground contour balances the tendency of the discs to throw their supporting frame to one side of the line of draft. The face of wheel 50 which rolls along the bottom of the trench, in rear of the larger disc 47, is preferably tapered as shown in Fig. 1 to better accommodate itself to the bottom of the ditch and also to aid in causing the rear of the frame to follow a straight line with reference to the path traversed by the wheels 10.

By employing the combination of the three discs it will be seen, that the earth is thrown both on the right and left hand sides of the furrow to provide a two-way ditch which is especially intended for draining swampy areas and shallow ponds. Other types of wet lands may however be drained best by lateral trenches in which the earth is thrown up on only one bank and my invention is directed to providing a machine adapted for both of the above mentioned services. In the latter case this is accomplished by removing the disc 46. This being on the left hand side of the machine results in permitting the discs 45—47 to cut the furrow and discharge the earth to form a bank entirely on its right hand side. It is understood of course that in cutting such a trench the direction of operation of the machine is such that the bank formed by the excavation will be placed on what would otherwise be the low side of the furrow.

I claim:

1. In a disc ditching plow, the combination with a forward wheel supported carriage, a single piece trailing frame having a wheel supporting the rear end thereof, the face of said wheel lying in the median line of the carriage and rotating in a plane extending at a slight angle to said line of two forward discs journaled one behind the other on said frame equidistantly at opposite sides of said median line and a third disc journaled on the frame in rear of the first mentioned discs and in a central position with respect to them, all of said discs being substantially journaled in the plane of the trailing frame.

2. In a disc ditching plow, the combination with a forward wheel supported carriage, and a trailing frame composed of a single forging comprising a forward tongue attached to the carriage, diverging laterally and rearwardly extending arms on the tongue in substantially the same plane therewith, a third arm extending inwardly and rearwardly on one of the first mentioned arms and a tail piece on the rear end of the third arm disposed at one side of the median line of the tongue, of a wheel journaled on said tail piece, and a disc journaled on each of the three arms of said frame.

LEVI C. HESTER.

REFERENCES CITED

The following references are of record in the file of this patent:

UNITED STATES PATENTS

| Number | Name | Date |
| --- | --- | --- |
| 1,421,109 | Thomson | June 27, 1922 |